(12) United States Patent
Salu et al.

(10) Patent No.: US 12,110,823 B2
(45) Date of Patent: Oct. 8, 2024

(54) OPTIMIZED CO-GENERATING SYSTEM AND RECOVERY METHOD FOR POWER, WATER AND NITROGEN

(71) Applicant: SAUDI ARABIAN OIL COMPANY, Dhahran (SA)

(72) Inventors: Samusideen Adewale Salu, Ras Tanura (SA); Hussain M. Bayat, Saihat (SA); Ali Mohammad Abbas, Ank (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/052,474

(22) Filed: Nov. 3, 2022

(65) Prior Publication Data
US 2024/0151180 A1   May 9, 2024

(51) Int. Cl.
| | |
|---|---|
| *F02C 6/18* | (2006.01) |
| *F25B 27/02* | (2006.01) |
| *B01D 53/047* | (2006.01) |
| *B01D 53/26* | (2006.01) |

(Continued)

(52) U.S. Cl.
CPC ............. *F02C 6/18* (2013.01); *F25B 27/02* (2013.01); *B01D 53/047* (2013.01); *B01D 53/265* (2013.01); *B01D 2253/108* (2013.01); *B01D 2257/102* (2013.01); *B01J 20/18* (2013.01); *F03G 4/035* (2021.08)

(58) Field of Classification Search
CPC .......... F02C 6/18; F25B 27/02; B01D 53/047; B01D 53/265; B01D 2253/108; B01D 2257/102; B01J 20/18; F03G 4/035; F01K 25/10–106
See application file for complete search history.

(56) References Cited

U.S. PATENT DOCUMENTS

| | | |
|---|---|---|
| 4,988,490 A | 12/1991 | Nicholas et al. |
| 7,043,920 B2 | 5/2006 | Viteri et al. |
| 10,071,337 B2 | 9/2018 | Sundaram et al. |

(Continued)

OTHER PUBLICATIONS

Cheng et al., "Experimental Study on Water Recovery from Flue Gas Using Macroporous Ceramic Membrane," Materials, Feb. 10, 2020, 18 pages.

*Primary Examiner* — Gerald L Sung
*Assistant Examiner* — Rene D Ford
(74) *Attorney, Agent, or Firm* — Osha Bergman Watanabe & Burton LLP

(57) ABSTRACT

A recovery system includes a special organic Rankine cycle (SORC) system, an internal combustion system, a nitrogen generator and a gas-liquid separator. The SORC system includes a first stage heat exchanger (first HE), a plurality of second stage heat exchangers (second HE), a third stage heat exchanger (third HE), a turbo-expander, and at least one condenser. A recovery method, conducted in the recovery system, includes vaporizing a refrigerant, introducing the vaporized refrigerant to the turbo-expander to generate electricity, condensing the vaporized refrigerant in the at least one condenser, collecting nitrogen from the flue gas feed in the nitrogen generator, and collecting water from the flue gas feed in the gas-liquid separator. The refrigerant is vaporized by introducing the refrigerant through the first HE, second HE and third HE sequentially, and the flue gas feed through the third HE, second HE and first HE sequentially.

20 Claims, 3 Drawing Sheets

(51) Int. Cl.
 *B01J 20/18* (2006.01)
 *F03G 4/00* (2006.01)

(56) References Cited

U.S. PATENT DOCUMENTS

| | | |
|---|---|---|
| 10,071,338 B2 | 9/2018 | Sundaram et al. |
| 10,125,641 B2 | 11/2018 | Sundaram et al. |
| 10,480,411 B2 * | 11/2019 | Uechi ................. F01K 7/22 |
| 10,677,160 B2 | 6/2020 | Sundaram et al. |
| 2007/0006592 A1 * | 1/2007 | Balan ................. F02C 3/22 |
| | | 60/39.182 |
| 2013/0145773 A1 * | 6/2013 | Kulkarni ............. F02C 3/34 |
| | | 60/39.5 |
| 2018/0094547 A1 * | 4/2018 | Cha ................... F01K 11/02 |
| 2022/0364772 A1 * | 11/2022 | Bunce ................. F25B 9/06 |

\* cited by examiner

OPTIMIZED CO-GENERATING SYSTEM AND RECOVERY METHOD FOR POWER, WATER AND NITROGEN

BACKGROUND

A hydrocarbon-based power generating plant generally includes combustion gas turbines (CGT) which generate electricity by combusting fuel and activating turbines with the gas generated by the combustion process. In many modern power generating plants, co-generating systems, such as heat recovery steam generators (HRSG), are installed in order to recover the heat energy contained in the flue gas (exhaust gas) from CGT. However, systems such as HRSG require high temperature flue gas to generate high-pressure, high-temperature, dry steam that is useful in operating steam power turbines or for general utility. Flue gas from HRSG or other processing equipment with an internal hydrocarbon combustion system, such as steam boilers, reboilers, and fire-heaters, may contain additional heat energy. However, such flue gas is discharged into the environment without further energy recovery. In addition, the flue gas may contain a substantial amount of moisture which can be recovered for utility use. Accordingly, there exists a need for continuing improvement of energy and resource recovery systems and methods for the flue gas from power generating plants and equipment with an internal combustion process.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a recovery system comprising a special organic Rankine cycle (SORC) system, an internal combustion system, a nitrogen generator and a gas-liquid separator. The SORC system comprises a first stage heat exchanger, a plurality of second stage heat exchangers, a third stage heat exchanger, a turbo-expander, and at least one condenser.

The SORC system is configured to generate electricity with heat provided by a flue gas feed. The plurality of the second stage heat exchanger is fluidly connected to the first stage heat exchanger and the third stage heat exchanger, the turbo-expander is fluidly connected to the third stage heat exchanger and the at least one condenser, and the first stage heat exchanger is fluidly connected to the at least one condenser.

The internal combustion system is configured to provide the flue gas feed to the SORC system, and is fluidly connected to the third stage heat exchanger. The nitrogen generator is configured to collect nitrogen from the flue gas feed, and is fluidly connected to the first stage heat exchanger and the plurality of the second stage heat exchanger. The gas-liquid separator is configured to collect water from the flue gas feed, and is fluidly connected to the first stage heat exchanger.

In another aspect, embodiments disclosed herein relate to a recovery method, conducted in the recovery system. The method comprises vaporizing a refrigerant, introducing the vaporized refrigerant to the turbo-expander to generate electricity, condensing the vaporized refrigerant in the at least one condenser, collecting nitrogen from the flue gas feed in the nitrogen generator, and collecting water from the flue gas feed in the gas-liquid separator.

Vaporizing of the refrigerant comprises introducing the refrigerant through the first stage heat exchanger, the plurality of second stage heat exchangers, and the third stage heat exchanger sequentially, and introducing the flue gas feed through the third stage heat exchanger, the plurality of second stage heat exchangers, and the first stage heat exchanger sequentially.

Other aspects and advantages of the claimed subject matter will be apparent from the following description and the appended claims.

DETAILED DESCRIPTION

In one aspect, embodiments disclosed herein relate to a recovery system comprising a special organic Rankine cycle (SORC) system, an internal combustion system, a nitrogen generator and a gas-liquid separator. The SORC system is configured to recover heat from a flue gas and may comprise a first stage heat exchanger, a plurality of second stage heat exchangers, a third stage heat exchanger, a turbo-expander, and at least one condenser.

Figure 1:
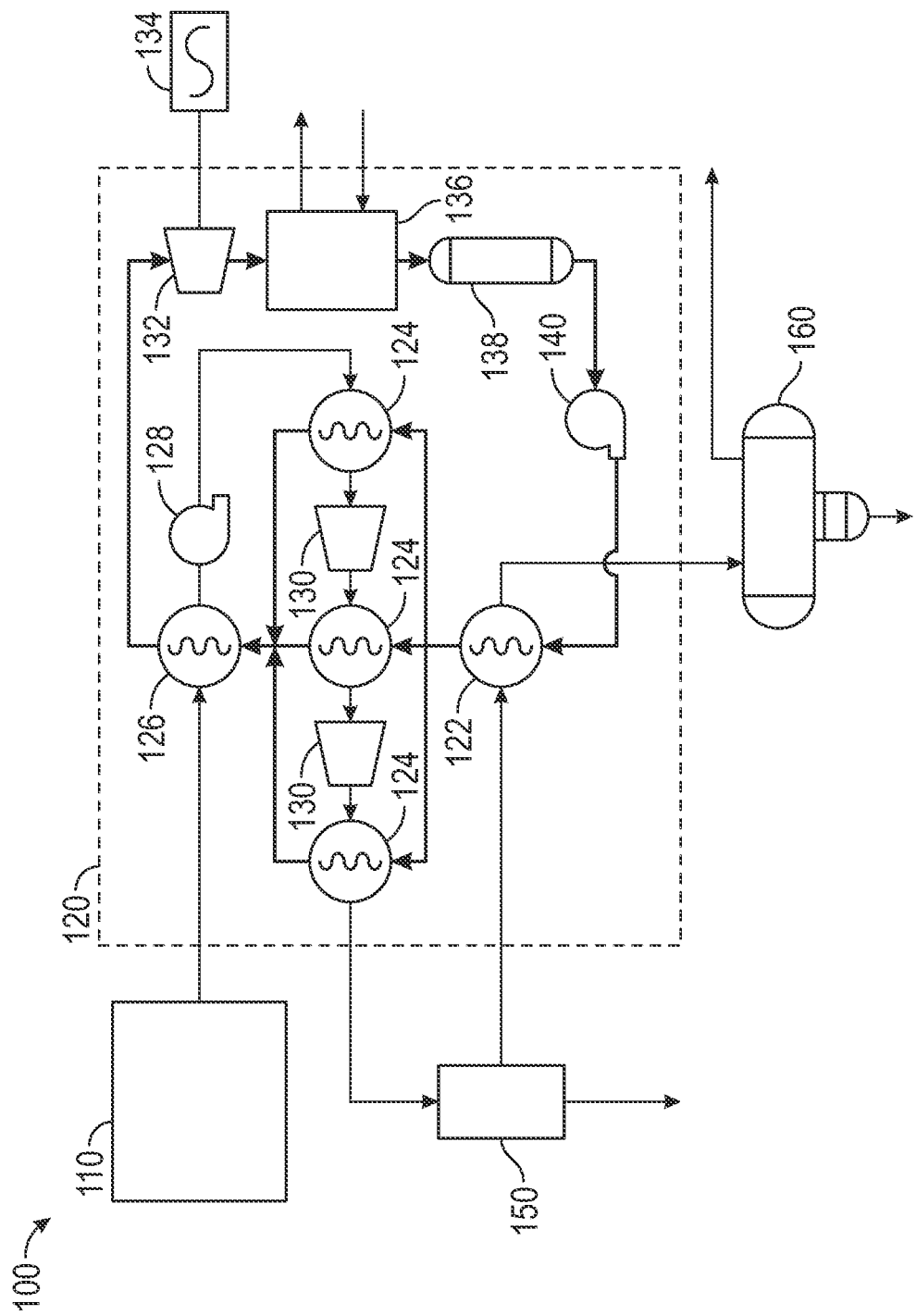
FIG. 1 is a schematic diagram of a recovery system in accordance with one or more embodiments.

FIG. 1 is a schematic diagram of a recovery system 100 in accordance with the present disclosure. A flue gas feed produced by an internal combustion system 110 is introduced to a third stage heat exchanger 126 ("third HE") of an SORC system 120 fluidly connected to an internal combustion system 110. In the present disclosure, "fluidly connected" means that components are connected such that a fluid is able to flow from one component to another, without the two components necessarily being physically connected to one another. The components may be fluidly connected with pipes, tubes and conduits, or any manner provided that the fluid may flow from one component to another. The fluidly connected components may have other apparatus in between. The flue gas feed may comprise air, moisture and components produced as a result of the combustion process. In one or more embodiments, the third HE 126 is located inside of an exhaust duct of the internal combustion system 110. The third HE 126 transfers the heat from the flue gas feed to a refrigerant flowing through the third HE 126. The flue gas feed exits the third HE 126, and enters a blower 128. The flue gas feed exiting the blower 128 enters a plurality of second stage heat exchangers 124 ("second HE") fluidly connected to the third HE 126. In one or more embodiments, the SORC system 120 comprises at least one compressor 130 between the plurality of second HE 124, as shown in FIG. 1. The second HE 124 transfers the heat from the flue gas feed to the refrigerant flowing through the plurality of second HE 124. The at least one compressor 130 compresses the flue gas feed, which may result in the flue gas feed temperature increasing for additional provision of heat to the refrigerant. The flue gas feed exits the plurality of second HE 124 and enters a nitrogen generator 150 fluidly connected to the second HE 124. The nitrogen generator 150 removes a portion of nitrogen gas comprised in the flue gas feed. The flue gas feed exits the nitrogen generator 150 and enters a first stage heat exchanger 122 ("first HE") fluidly connected to the nitrogen generator 150. The first HE 122 transfers the heat from the flue gas feed to the refrigerant flowing through the first HE 122. The flue gas feed exits the first HE 122 and enters a gas-liquid separator 160 fluidly connected to the first HE 122. The gas-liquid separator 160 separates condensed water from the flue gas feed. The condensed water and the flue gas feed exit the recovery system 100 separately. The recovery system 100 comprising three stages of heat exchangers may provide optimized total heat recovery, and also help to prevent condensation inside of the exhaust duct of the internal combustion system 110 and the blower 128.

The SORC system 120 of the recovery system 100 also comprises a refrigerant which circulates through the SORC system 120 and undergoes vaporization/condensation cycles. A refrigerant in a liquid state enters the first HE 122 from a pump 140 (as explained below) and the first HE 122 transfers the heat from the flue gas feed to the refrigerant. The refrigerant exits the first HE 122 and enters the plurality of second HE 124 fluidly connected to the first HE 122 to be heated further by the flue gas feed. The refrigerant exits the plurality of second HE 124 and enters the third HE 126 fluidly connected to the plurality of the second HE 124. The refrigerant is vaporized in the third HE 126 by the heat provided by the flue gas feed from the internal combustion system 110 and exits the third HE 126 as vaporized refrigerant. The vaporized refrigerant enters a turbo-expander 132 fluidly connected to the third HE 126. The turbo-expander 132 is connected to a generator 134. The turbo-expander 132 is activated by the vaporized refrigerant and the generator 134 connected to the turbo-expander 132 generates electricity. The vaporized refrigerant exits the turbo-expander 132 and enters at least one condenser 136 fluidly connected to the turbo-expander 132. The at least one condenser 136 condenses the vaporized refrigerant back to liquid with the use of a coolant, such as cooling water. The refrigerant exits the at least one condenser 136, flows through a surge vessel 138 and a pump 140 to circulate back to the first HE 122, which is fluidly connected to the at least one condenser 136. The refrigerant may then recirculate through the SORC system 120 as described above.

SORC System

In one or more embodiments, the SORC system 120 comprises a first stage heat exchanger 122, a plurality of second stage heat exchangers 124, a third stage heat exchanger 126, a turbo-expander 132, and at least one condenser 136. The SORC system 120 may be configured to recover heat from a flue gas feed by generating electricity with the heat provided by a flue gas feed. In one or more embodiments, the first HE 122, the plurality of second HE 124 and the third HE 126 are fluidly connected.

Heat exchangers are generally known as devices designed to transfer heat between two or more fluids of different temperatures. The heat exchangers of one or more embodiments may be configured such that fluids introduced into the heat exchangers do not mix with each other during the heat exchanging process. The heat exchangers may also be referred to as evaporators.

In one or more embodiments, the SORC system 120 comprises a first HE 122 fluidly connected to a nitrogen generator 150 and a gas-liquid separator 160. The first HE 122 may also be fluidly connected to at least one condenser 136 and a plurality of second HE 124. In the first HE 122, the refrigerant entering from the condenser 136 decreases the temperature of the flue gas feed entering from the nitrogen generator 150. The refrigerant then exits the first HE 122 and enters the plurality of second HE 124, and the flue gas feed exits the first HE 122 and enters the gas-liquid separator 160. In one or more embodiments, the SORC system 120 comprises a surge vessel 138 and a pump 140 in between the condenser 136 and the first HE 122 to provide appropriate pressure and flow rate of the refrigerant entering the first HE 122. The surge vessel 138 also provides the liquid holding surge volume and required net positive suction head for the pump 140.

In one or more embodiments, the SORC system 120 comprises a plurality of second HE 124 fluidly connected to the third HE 126 and the nitrogen generator 150 to receive the flue gas feed from the third HE 126 and introduce to the nitrogen generator 150. The plurality of second HE 124 may also be fluidly connected to the first HE 122 and third HE 126 separately from the flue gas connection to receive the refrigerant from the first HE 122 and introduce to third HE 126. In the plurality of second HE 124, heat is transferred from the flue gas feed to the refrigerant, and the temperature of the flue gas feed is decreased as a result. In one or more embodiments, the plurality of second HE 124 has 3 heat exchangers.

In one or more embodiments, the plurality of second HE 124 is configured to receive the refrigerant in parallel. As illustrated in FIG. 1, the refrigerant line from the first HE 122 may be branched such that the refrigerant enters each of the second HE 124 in parallel, and may be rejoined prior to entering the third HE 126. In one or more embodiments, the plurality of the second HE 124 is configured to receive the flue gas feed in series such that the flue gas feed is introduced to each heat exchanger of the plurality of the second HE 124 sequentially, as illustrated in FIG. 1.

In one or more embodiments, the SORC system 120 comprises compressors 130 in between the heat exchangers of the plurality of the second HE 124 to increase the pressure of the flue gas feed flowing through the plurality of the second HE 124. Pressurization of the flue gas feed through the compressors 130 may increase the temperature of the flue gas feed and formation of water condensate in the flue gas feed. The heat and condensate generated due to the pressurization may be recovered in the first HE 122 and the gas-liquid separator 160. The pressurization also enables the flue gas feed to flow through the downstream elements of the recovery system 100, which may include the nitrogen generator 150, the first HE 122 and the gas-liquid separator 160, and compensates for the frictional pressure loss. The compressors 130 may also provide appropriate pressure condition of the flue gas feed for effective nitrogen removal from the flue gas feed in the nitrogen generator 150.

In one or more embodiments, the SORC system 120 comprises a third HE 126 fluidly connected to an internal combustion system 110 and the plurality of second HE 124 to receive the flue gas feed from the internal combustion system 110 and introduce to the plurality of the second HE 124. The third HE 126 may also be fluidly connected to a turbo-expander 132 and the plurality of second HE 124 separately from the flue gas connection to receive the refrigerant from the plurality of second HE 124 and introduce to the turbo-expander 132. In the third HE 126, the refrigerant entering from the plurality of the second HE 124 decreases the temperature of the flue gas feed entering from the internal combustion system 110. The refrigerant in the third HE 126 may be heated by the flue gas feed above the boiling point to be vaporized (vaporized refrigerant). The vaporized refrigerant then exits the third HE 126 and enters the turbo-expander 132, and the flue gas feed exits the third HE 126 and enters the plurality of the second HE 124. In one or more embodiments, the flue gas feed exiting the third HE 126 flows through a blower 128 prior to entering the plurality of second HE 124. In one or more embodiments, the third HE 126 is located in the exhaust duct of the internal combustion system 110.

In one or more embodiments, the SORC system 120 comprises a turbo-expander 132 fluidly connected to the third HE 126 and the at least one condenser 136. In one or more embodiments, the turbo-expander 132 is any apparatus capable of being activated by a gaseous fluid having elevated temperature and pressure, and driving a power generator or rotating equipment, such as a pump, a compressor and a blower. In one or more embodiments, a turbo-expander 132 is a centrifugal or axial-flow turbine through which a high-pressure gas is expanded to produce energy that drives the power generator or rotating equipment.

In one or more embodiments, the turbo-expander 132 is connected to a generator 134 and receives a vaporized refrigerant from the third HE 126. The turbo-expander 132 activated by the vaporized refrigerant drives the generator 134 connected to the turbo-expander 132, generating electricity. The vaporized refrigerant then exits the turbo-expander 132 and flows to the at least one condenser 136.

In one or more embodiments, the SORC system 120 comprises at least one condenser 136 fluidly connected to the turbo-expander 132 and the first HE 122. The vaporized refrigerant from the turbo-expander 132 enters the condenser 136 to be condensed by a coolant, such as air and water. In one or more embodiments, the at least one condenser 136 is a 2-stage condenser comprising a fin-fan air cooler and a heat exchanger.

Figure 2:
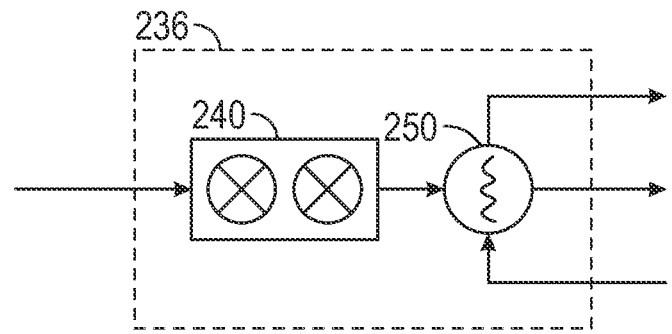
FIG. 2 is a schematic diagram of at least one condenser of the recovery system in accordance with one or more embodiments.

FIG. 2 illustrates one or more embodiments of the at least one condenser 236. The at least one condenser 236 comprises a fin-fan air cooler 240 and a heat exchanger 250. Vaporized refrigerant from the turbo-expander 132 (shown as 132 in FIG. 1) enters the fin-fan air cooler 240. The fin-fan air cooler 240 comprises a plurality of fans and conduits with fins for the refrigerant. The vaporized refrigerant flowing through the conduits of the fin-fan air cooler 240 is cooled by the air flow generated by the plurality of fans. The refrigerant stream exiting the fin-fan air cooler 240 may be gas, liquid or a mixture of liquid and gas. The refrigerant stream enters the heat exchanger 250 in which the refrigerant is further cooled by a coolant, such as water. The heat exchanger 250 may be any device capable of reducing the temperature of the refrigerant stream with a coolant. In one or more embodiments, the heat exchanger 250 is configured such that the refrigerant and the cooling medium introduced to the heat exchanger do not mix with each other during the heat exchanging process.

In one or more embodiments, the at least one condenser 236 is configured such that one or both of fin-fan air cooler 240 and the heat exchanger 250 are activated and inactivated at will for optimized cooling and obtaining constant outlet temperature of the refrigerant regardless of the ambient temperature. For example, both fin-fan air cooler 240 and the heat exchanger 250 is activated during the summer, and only fin-fan air cooler 240 is activated during the winter, as the fin-fan air cooler 240 may provide adequate cooling to obtain the required refrigerant temperature.

Internal Combustion System

In one or more embodiments, the recovery system 100 comprises an internal combustion system (shown as 110 in FIG. 1) configured to provide the flue gas feed to the SORC system 120. The internal combustion system 110 may be fluidly connected to the SORC system 120. The internal combustion system 110 may be any system capable of providing a flue gas feed having an elevated temperature. Examples of the internal combustion system 110 may include, but are not limited to, steam boilers, reboilers, furnaces fire heaters, combustion gas turbines (CGT), and heat recovery steam generators (HRSG).

Figure 3:
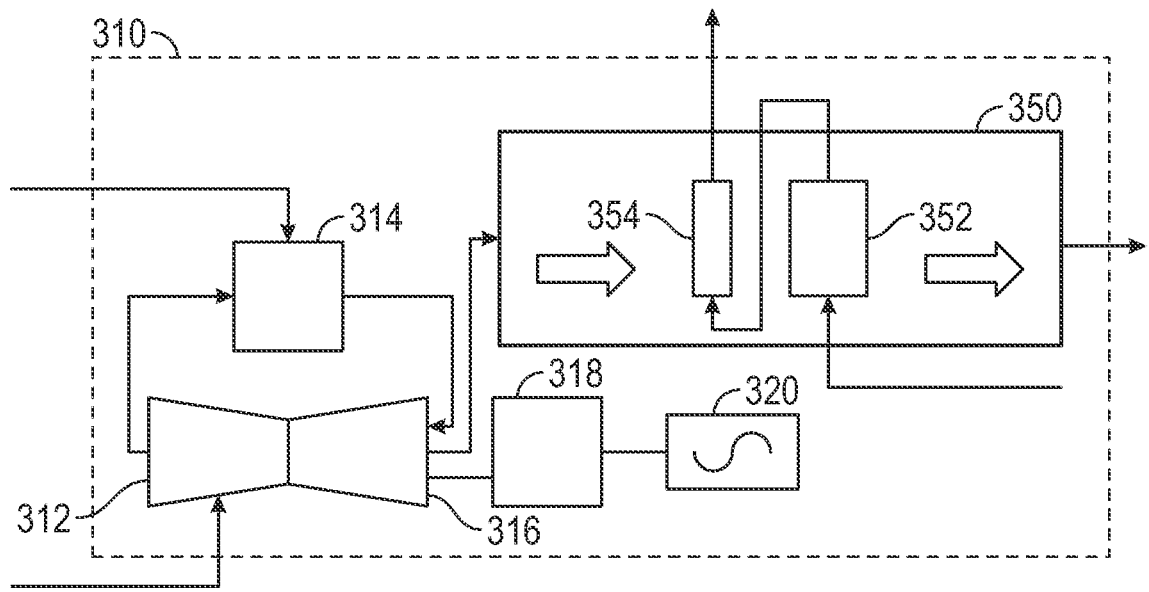
FIG. 3 is an internal combustion system of the recovery system in accordance with one or more embodiments.

In one or more embodiments, the internal combustion system 110 is a combustion gas turbine/heat recovery steam generation (CGT/HRSG) system. FIG. 3 is a schematic diagram of a CGT/HRSG system 310 comprised in the recovery system 100 of FIG. 1. Air enters a compressor 312 of the CGT/HRSG system 310 and compressed air from the compressor 312 enters a combustor 314 fluidly connected to the compressor 312. A fuel is also introduced to the combustor 314 where the fuel is combusted in the presence of air. Exhaust having an elevated temperature and pressure from the combustor 314 enters a turbine 316 fluidly connected to the combustor 314. The turbine 316 is connected to a gear box 318 and a generator 320. The exhaust activates the turbine 316 and the generator 320 generates electricity. The exhaust exits the turbine 316 and enters an HRSG system 350 fluidly connected to the turbine 316. The HRSG system 350 comprises an evaporator 352 and a super heater 354. The exhaust from the turbine 316 is first introduced to the super heater 354 in the HRSG system 350 and the temperature of water vapor contained in the super heater 354 is increased by the exhaust. The exhaust further travels downstream to be introduced to an evaporator 352 where the exhaust provides heat to vaporize water contained in the evaporator 352. The water in the evaporator 352 may be demineralized water or boiler feed water (BFW). The evaporator 352 is fluidly connected to the super heater 354, and the generated water vapor in the evaporator 352 enters the super heater 354 to be heated by the exhaust. The water vapor exits the super heater 354, and the exhaust exits the HRSG system 350 and enters the aforementioned SORC system 120 of FIG. 1. The HRSG system 350 may comprise additional features such as dampers to control the flow rate of flue gas feed through the HRSG system 350, or allow the flue gas feed to bypass the HRSG system 350.

Nitrogen Generator

In one or more embodiments, the recovery system 100 comprises a nitrogen generator (shown as 150 in FIG. 1) configured to collect nitrogen from the flue gas feed. The nitrogen generator 150 may be fluidly connected to the first HE 122 and the plurality of the second HE 124. The nitrogen generator 150 may be any apparatus capable of removing nitrogen from the flue gas feed through a process such as adsorption, absorption, dissolution, condensation and the like. In one or more embodiments, the nitrogen generator 150 is a pressure swing adsorber capable of adsorbing nitrogen through pressure swing adsorption (PSA) technology, and comprises a zeolite as an adsorber of nitrogen. PSA is generally known as a process to separate target gas species from a mixture under pressure with an adsorbent. Nitrogen collected from the flue gas feed may be placed in containers to be transported or stored, or may be used for utility purposes.

Gas-Liquid Separator

In one or more embodiments, the recovery system 100 comprises a gas-liquid separator configured to collect water from the flue gas feed (shown as 160 in FIG. 1). The gas-liquid separator 160 may be fluidly connected to the first HE 122. The gas-liquid separator 160, or a "knock-out vessel," may be any apparatus capable of separating condensed water from the flue gas feed. In one or more embodiments, the gas-liquid separator 160 comprises cooling tubes to further cool the flue gas feed or maintain the temperature of the flue gas feed below a condensation temperature, for example, at 90° F., in case the temperature of the flue gas feed increases due to increase in pressure. In one or more embodiments, the gas-liquid separator 160 is configured such that the refrigerant of the SORC system 120 flows through the cooling tubes as the coolant.

In one or more embodiments, the gas-liquid separator 160 has a water outlet to remove the collected water from the gas-liquid separator 160. The water outlet may be equipped with a filtering system to remove contaminants in the collected water such as soot and particles transferred from the flue gas feed. The quality of the water may be further controlled as required based on the requirements of the end use.

In one or more embodiments, the flue gas feed exiting the gas-liquid separator 160 is further treated to remove acidic gases such as sulfur oxide gas (SOx) and nitrogen oxide gas (NOx). The acidic gases may be eliminated by feeding an internal combustion system 110, such as the CGT/HRSG system 310, with sweet fuel gas and/or by providing the internal combustion system 110, such as the CGT/HRSG system 310, with flue gas monitoring system to effectively control the internal combustion temperature of the internal combustion system 110. Sweet fuel gas refers to as a gas comprising no or a trace amount of sulfur compounds such as hydrogen sulfide.

Flue Gas Feed

In one or more embodiments, a flue gas feed is any gaseous fluid comprising water and air, having an elevated temperature, and is capable of generating electricity in the recovery system 100 with the comprised heat. In one or more embodiments, the flue gas feed is an exhaust gas generated by an internal combustion system 110 such as CGT/HRSG system 310, steam boilers, reboilers fire-heaters and the like.

In one or more embodiments, the flue gas feed comprises air and moisture. The flue gas feed may also comprise acidic gases such as SOx and NOx, soot and particles generated as a result of the combustion of a fuel.

In one or more embodiments, the flue gas feed exiting the internal combustion system 110 and entering the third HE 126 of the SORC system 120 has a temperature in a range of from about 400 to 500° F. In case the internal combustion system 110 is a CGT/HRSG system 310, the exhaust exiting the turbine 316 may have a temperature of about 1000° F. and the flue gas feed exiting the HRSG system 350 may have a temperature in a range from about 400 to 500° F.

In one or more embodiments, the flue gas feed exiting the third HE 126 and entering the plurality of second HE 124 has a temperature in a range of from about 120 to about 140° F., such as a lower limit selected from any one of 120 and 125° F. to an upper limit selected from any one of 135 and 140° F., where any lower limit may be paired with any upper limit. The flue gas feed exiting the third HE 126 and entering the plurality of second HE 124 may have a temperature above the condensation temperature of water, such as 20° F. or more above the condensation temperature of water, to avoid condensation.

In one or more embodiments, the flue gas feed exiting the third HE 126 has a pressure in a range of from about 0 psig (pounds per square gauge) to 1 psig, or may have a pressure of about 0 psig. In one or more embodiments, the flue gas feed entering the plurality of second HE 124 may have a pressure in a range of from about 4 psig to about 6 psig, or may have a pressure of about 5 psig, as a result of pressurization by a blower 128 disposed between the third HE 126 and the plurality of second HE 124.

In one or more embodiments, the flue gas feed exiting the plurality of second HE 124 and entering the nitrogen generator 150 has a temperature in a range of from about 135 to about 160° F., such as a lower limit selected from any one of 135, 140 and 145° F. to an upper limit selected from any one of 155 and 160° F., where any lower limit may be paired with any upper limit. The flue gas feed exiting the plurality of second HE 124 may have a higher temperature than the flue gas feed entering the plurality of second HE 124 due to the compression of the flue gas feed in the at least one compressor 130, as described below.

In one or more embodiments, the flue gas feed exiting the plurality of second HE 124 and entering the nitrogen generator 150 has a pressure in a range of from about 90 psig to 110 psig, or may have a pressure of 100 psig, as a result of pressurization by at least one compressor 130 disposed between each heat exchanger of the plurality of second HE 124. As noted previously, pressurization of the flue gas through the at least one compressor 130 may increase the temperature of the flue gas feed and formation of water condensate, and may enable the flue gas feed to flow through the downstream elements of the recovery system 100 by compensating for the frictional pressure loss. In one or more embodiments, the flue gas feed entering the nitrogen generator 150 has a water vapor concentration in a range of from about 8 volume % (vol %) to 10 vol %, or from about 8 mole % (mol %) to 10 mol %.

In one or more embodiments, the flue gas feed exiting the nitrogen generator 150 and entering the first HE 122 has a temperature in a range of from about 140 to 160° F. such as a lower limit selected from any one of 140 and 145° F. to an upper limit selected from any one of 155 and 160° F., where any lower limit may be paired with any upper limit. In one or more embodiments, the flue gas feed exiting the nitrogen generator 150 and entering the first HE 122 has a water vapor concentration in a range of from about 30 vol % to 40 vol %, or from about 30 mol % to 40 mol %, or has a water vapor concentration of about 35 vol %, or about 35 mol %.

In one or more embodiments, the flue gas feed exiting the first HE 122 and entering the gas-liquid separator 160 has a temperature in a range of from about 80° F. to 100° F., such as a lower limit selected from any one of 80 and 85° F. to an upper limit selected from any one of 95 and 100° F. where any lower limit may be paired with any upper limit. The flue gas feed exiting the first HE 122 and entering the gas-liquid separator 160 may have a temperature of 90° F. The flue gas feed exiting the first HE 122 and entering the gas-liquid separator 160 may have a temperature below the condensation temperature of water, such as 20° F. or more below the condensation temperature of water, in order to maximize the water condensation. The condensation temperature of water may vary depending on the environmental conditions, such as temperature and relative humidity. The water condensation temperature under a specific condition may be determined by establishing a two phase (vapor-liquid) pressure-temperature (P-T) diagram for the specific fluid gas composition using process simulation software, such as HYSYS available from Aspen Technology, Inc., and PRO/II$^T$M available from AVEVA Group plc. In one or more embodiments, the condensation temperature is about 140° F.

Refrigerant

In one or more embodiments, a refrigerant is a fluid capable of efficiently vaporizing and condensing within the operating pressures and temperatures and is also thermodynamically stable. In one or more embodiments, the refrigerant is selected from the group consisting of ammonia, such as R-717 refrigerant, propane, freon, propylene, butane, toluene, benzene and combinations thereof.

In one or more embodiments, the refrigerant exiting the condenser 136 and being introduced to the first HE 122 has a temperature of about 90° F. or lower, such as 90° F. or lower, 85° F. or lower, 80° F. or lower, or 75° F. or lower. In one or more embodiments, a temperature difference of the refrigerant being introduced to the first HE 122, and the temperature of a coolant used in at least one condenser 136 is in a range of from about 5 to 25° F., such as a lower limit selected from any one of 5 and 10° F. to an upper limit selected from any one of 20 and 25° F., where any lower limit may be paired with any upper limit. In one or more embodiments, the temperature difference of the refrigerant being introduced to the first HE 122 and the temperature of the coolant used in at least one condenser 136 is about 15° F.

In one or more embodiments, the refrigerant exiting the condenser 136 and being introduced to the first HE 122 is at least 99 wt % liquid, at least 99.5 wt % liquid, at least 99.9 wt % liquid or 100 wt % liquid in order to maximize the heat energy obtained from the flue gas feed in the recovery system 100.

In one or more embodiments, the refrigerant in the third HE 126 is vaporized to be vaporized refrigerant. In one or more embodiments, the vaporized refrigerant exiting the third HE 126 and being introduced to the turbo-expander 132 is at least 99 wt % vapor, at least 99.5 wt % vapor, at least 99.9 wt % vapor or 100 wt % vapor. In one or more embodiments, the vaporized refrigerant exiting the third HE 126 and being introduced to the turbo-expander 132 has a temperature in a range of from about 350° F. to 400° F., or has a temperature of about 385° F. In one or more embodiments, a temperature difference of the vaporized refrigerant exiting the third HE 126 and being introduced to the turbo-expander 132, and the temperature of the flue gas feed introduced to the third HE 126 is in a range of from about 5 to 25° F., such as a lower limit selected from any one of 5 and 10° F. to an upper limit selected from any one of 20 and 25° F., where any lower limit may be paired with any upper limit. In one or more embodiments, temperature difference of the vaporized refrigerant exiting the third HE 126 and being introduced to the turbo-expander 132, and the temperature of the flue gas feed introduced to the third HE 126 is about 15° F.

Recovery Method

Figure 4:
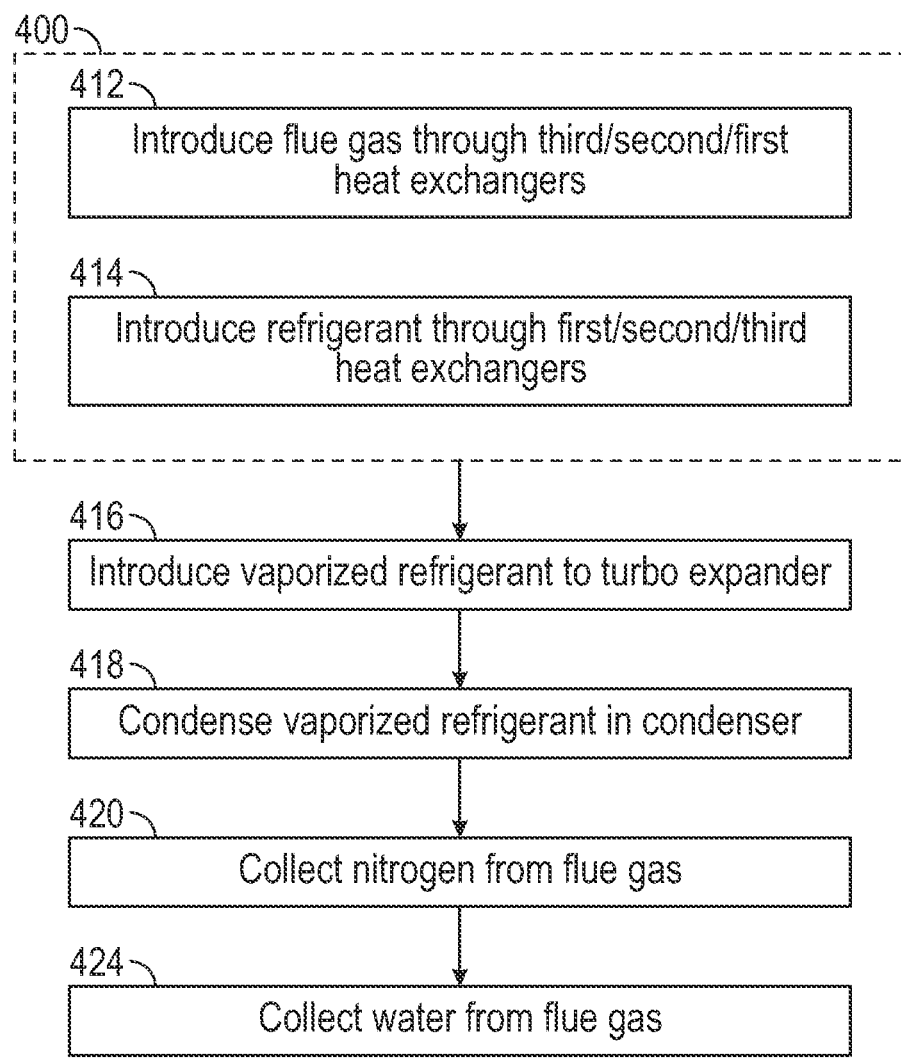
FIG. 4 is a flow diagram of a recovery method in accordance with one or more embodiments.

In one aspect, embodiments here relate to a recovery method for recovering power, water and nitrogen. FIG. 4 is a flow diagram of an exemplary recovery method. The method may be conducted by the recovery system 100 of FIG. 1, which may contain an SORC system 120, an internal combustion system 110, a nitrogen generator 150 and a gas-liquid separator 160.

At 400 of FIG. 4, a refrigerant is vaporized in the SORC system 120 of FIG. 1. The vaporizing step comprises introducing the refrigerant through the first HE 122, the plurality of second HE 124 and the third HE 126 sequentially (step 412 of FIG. 4), and introducing the flue gas feed the third HE 126, the plurality of second HE 124 and the first HE 122 sequentially (step 414 of FIG. 4). Introducing a fluid, such as the refrigerant or flue gas feed, through heat exchangers "sequentially" means that the fluid is introduced to each heat exchanger in the order as described. However, "sequentially" does not necessarily mean that the fluid is introduced to a subsequent heat exchanger immediately after the proceeding heat exchanger, and there may be other components in between the heat exchangers. For example, as described in FIG. 1, one or more embodiments have a blower 128 between the third HE 126 and the plurality of second HE 124, and a nitrogen generator 150 between the plurality of second HE 124 and the first HE 122. In such a configuration, a fluid introduced through the third HE 126, the blower 128, the plurality of second HE 124, the nitrogen generator 150 and the first HE 122 in the order is considered as introducing the fluid through the third HE 126, the plurality of second HE 124 and the first HE 122 sequentially.

At 416 of FIG. 4, the vaporized refrigerant having elevated pressure and temperature is introduced to a turbo-expander (132 of FIG. 1) such that the vaporized refrigerant activates the turbo-expander 132 and electricity is generated by a generator (134 of FIG. 1) connected to the turbo-expander 132.

At 418 of FIG. 4, the vaporized refrigerant exiting the turbo-expander 132 is condensed in at least one condenser (136 of FIG. 1). As shown in FIG. 1, the condensed refrigerant flows through a surge vessel 138 and a pump 140 and introduced to the first HE 122.

At 420, nitrogen is collected from the flue gas feed in the nitrogen generator (150 of FIG. 1). A portion of nitrogen comprised in the flue gas feed is removed through various methods available in the art, including adsorption. Collection of nitrogen increases the water vapor concentration in the flue gas feed.

At 424, water is collected from the flue gas feed in the gas-liquid separator (160 of FIG. 1). The gas-liquid separator 160 separates condensed water in flue gas feed from gaseous components, and the condensed water and gaseous components of the flue gas feed separately exits the gas-liquid separator 160.

It is understood that the disclosed method may be conducted on a continuous basis or intermittent basis and thus, the steps as described in FIG. 4 may occur simultaneously and do not necessarily occur in the order as illustrated in FIG. 4.

In one or more embodiments, the method comprises vaporizing a refrigerant to generate a vaporized refrigerant having elevated temperature and pressure and capable of activating a turbo-expander 132 or an apparatus activated by a pressurized gas. The vaporizing of the refrigerant may be conducted in the SORC system 120. In one or more embodiments, at least 99 wt %, such as at least 99 wt %, at least 99.5 wt %, at least 99.9 wt % or 100 wt %, of the refrigerant is vaporized as a result of the vaporizing. In one or more embodiments, the vaporization of the refrigerant is conducted in the third HE 126.

In one or more embodiments, the flue gas feed introduced to the plurality of the second HE 124 has a temperature above a condensation temperature of water, such as 20° F. or more above the condensation temperature of water, to avoid condensation.

In one or more embodiments, the flue gas feed exiting the first HE 122 has a temperature below a condensation temperature of water, such as 20° F. or more below the condensation temperature of water, in order to maximize water condensation. In one or more embodiments, the flue gas feed exiting the first HE 122 has a temperature in a range from about 80° F. to 100° F., such as a lower limit selected from any one of 80 and 85° F. to an upper limit selected from any one of 95 and 100° F. where any lower limit may be paired with any upper limit.

In one or more embodiments, the method comprises introducing the vaporized refrigerant to the turbo-expander 132 to generate electricity. The vaporized refrigerant introduced to the turbo-expander 132 has a temperature in a range of from about 350° F. to 400° F., or has a temperature of about 385° F.

In one or more embodiments, the method comprises condensing the vaporized refrigerant. The condensing may be conducted in at least one condenser 136. In one or more embodiments, at least 99 wt %, such as at least 99 wt %, at least 99.5 wt %, at least 99.9 wt % or 100 wt %, of the refrigerant is condensed as a result of the condensing step. In one or more embodiments, the condensed refrigerant has a temperature of about 90° F. or lower, such as 90° F. or lower, 85° F. or lower, 80° F. or lower, or 75° F. or lower. The flue gas feed exiting the first HE 122 and entering the gas-liquid separator 160 may have a temperature of about 100° F. The flue gas feed exiting the first HE 122 may have a temperature below the condensation temperature of water, such as 20° F. or below the condensation temperature of water.

In one or more embodiments, the method comprises collecting nitrogen from a flue gas feed in a nitrogen generator 150. The collecting of nitrogen may be conducted by various methods, including adsorption with a adsorbent such as a zeolite. The collection of nitrogen may be conducted under an elevated pressure, such as a pressure in a range of from about 90 psig to 110 psig, or 100 psig. In one or more embodiments, the flue gas feed exiting the nitrogen generator 150 has a water vapor concentration in a range from about 30 to 40 vol %, or from about 30 to 40 mol %, as a result of the collection of nitrogen by the nitrogen generator 150.

In one or more embodiments, the method comprises collecting water from the flue gas feed in a gas-liquid separator 160. The flue gas feed may have condensed water due to its elevated pressure and a temperature below a condensation temperature of water. In one or more embodiments, the collection of water may be conducted at a temperature in a range of from about 80° F. to 100° F., such as a lower limit selected from any one of 80 and 85° F. to an upper limit selected from any one of 95 and 100° F. where any lower limit may be paired with any upper limit. The collection of water may be conducted at a temperature below the condensation temperature of water, or at a temperature of about 90° F. In one or more embodiments, the temperature of the flue gas feed introduced to the gas-liquid separator 160 is maintained below the condensation temperature by introducing the flue gas feed to the first HE 122.

In one or more embodiments, the method comprises pressurizing the flue gas feed. The pressurization of the flue gas feed may be conducted at any location within the recovery system 100. In one or more embodiments, the flue gas is pressurized prior to, or while being introduced to the plurality of second HE 124. As previously described, the SORC system 120 may comprise a blower 128, and at least one compressor 130 between the plurality of second stage heat exchangers to pressurize the flue gas feed. The flue gas feed flowing through the blower 128 may be pressurized to a range of from about 1 psig to 10 psig, or about 5 psig. The flue gas feed flowing through the plurality of second HE 124 may be pressurized to a range of from about 90 psig to 110 psig, or about 100 psig.

In one or more embodiments, the method comprises combusting fuel in an internal combustion system 110 to generate electricity and the flue gas feed. As previously described, the internal combustion system 110 may comprise a combustor to which a fuel and compressed air is introduced and combusted. The internal combustion system 110 may further comprise a turbine connected to a generator. A flue gas feed generated as a result of the combustion of the fuel may have elevated temperature and pressure activates the turbine and the generator connected to the turbine generates electricity. In case the internal combustion system 110 is a CGT/HRSG system 310, the exhaust exiting the turbine 316 may have a temperature of about 1000° C. The flue gas feed may flow through an HRSG system 350 before being introduced to the SORC system 120. The temperature of the flue gas feed exiting the HRSG system 350 may be in a range of from 400 to 500° F.

In one or more embodiments, the increase ratio of the electrical power produced by the method conducted by the recovery system 100, based on the electrical power produced by combusting the fuel in the internal combustion system 110 comprised in the recovery system 100, is at least 0.18 (0.18:1 or 1:5.6). In one or more embodiments, the increase ratio of the electrical power produced by the method conducted by the recovery system 100 based on the electrical power produced by combusting the fuel in the internal combustion system 110 comprised in the recovery system 100, is in a range of from about 0.18 to 0.20 (1:5.6 to 1:5), or is 0.18 (0.18:1 or 1:5.6). The increase ratio refers to the ratio of additional electrical power generated by the method conducted by the recovery system 100 to the electrical power generated by the internal combustion system 110 comprised in the recovery system 100 only. For example, the additional electrical power produced by the method by the recovery system 100 may be 0.18 MW per 1 MW of electrical power produced by combusting the fuel in the internal combustion system 110. In such a case, 0.18 MW of electrical power is generated by the SORC system 120 per 1 MW of electrical power produced by the internal combustion system 110, and the increase ratio is 0.18 MW/1 MW=0.18. 0.18 MW of electrical power generated by combustion of a fuel may correspond to about 3.2 tons/day of $CO_2$ gas emission. Therefore, the total electrical power generated by the method may reduce about 3.2 tons/day of $CO_2$ gas emission based on 1 MW of electrical power produced by the internal combustion system 110.

In one or more embodiments, the amount of nitrogen collected by the method conducted by the recovery system 100 is at least 1 ton/hour (hr), 2 tons/hr, 3 tons/hr, 4 tons/hr or 5 tons/hr, based on 1 MW of electrical power produced by the combusting of the fuel in the internal combustion system 110. In one or more embodiments, the amount of nitrogen collected by the method, based on 1 MW of electrical power produced by the combusting of the fuel in the internal combustion system 110, is in a range of from about 4 tons/hr to 5.3 tons/hr, such as a lower limit selected from any one of 4.0 and 4.5 tons/hr to an upper limit selected from any one of 5.0 amd 5.3 tons/hr, where any lower limit may be paired with any upper limit. In one or more embodiments, the amount of nitrogen collected by the method, based on 1 MW of electrical power produced by the combusting of the fuel in the internal combustion system 110, is about 5.3 tons/hr.

In one or more embodiments, the amount of water collected by the method conducted by the recovery system 100 is at least 10 U.S. gallons per minute (USGPM), at least 15 USGPM, at least 20 USGPM, at least 25 USGPM, at least 30 USGPM, or at least 35 USGPM, per 1 MW of electrical power produced by the combusting of the fuel in the internal combustion system 110. In one or more embodiments, the amount of water collected by the method, per 1 MW of electrical power produced by the combusting of the fuel in the internal combustion system 110, is in a range of from about 30 to 40 USGPM, such as a lower limit selected from any one of 30 and 32.5 USGPM to an upper limit selected from any one of 37.5 and 40 USGPM, where any lower limit may be paired with any upper limit. In one or more embodiments, the amount of water collected by the method, based on 1 MW of electrical power produced by the combusting of the fuel in the internal combustion system 110, is about 35 USGPM.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke means-plus-function for any limitations of any of the claims herein, except for those in which the claim expressly uses the words 'means for' together with an associated function.

What is claimed is:

1. A recovery system comprising:
   a Rankine cycle system, comprising:
      a first stage heat exchanger;
      a plurality of second stage heat exchangers;
      a third stage heat exchanger;
      a turbo-expander;
      at least one condenser; and
      at least one compressor between the plurality of second stage heat exchangers to pressurize the flue gas feed, wherein:
         the Rankine cycle system is configured to generate electricity with heat provided by a flue gas feed,
         the plurality of the second stage heat exchangers is fluidly connected to the first stage heat exchanger and the third stage heat exchanger,
         the turbo-expander is fluidly connected to the third stage heat exchanger and the at least one condenser, and
         the first stage heat exchanger is fluidly connected to the at least one condenser,
   an internal combustion system configured to provide the flue gas feed to the Rankine cycle system, and fluidly connected to the third stage heat exchanger;
   a nitrogen generator configured to collect nitrogen from the flue gas feed, and fluidly connected to the first stage heat exchanger and the plurality of the second stage heat exchangers; and
   a gas-liquid separator configured to collect water from the flue gas feed, and fluidly connected to the first stage heat exchanger.

2. The recovery system of claim 1, wherein the internal combustion system is a combustion gas turbine/heat recovery steam generation (CGT/HRSG) system.

3. The recovery system of claim 1, wherein the nitrogen generator comprises a zeolite.

4. A recovery method, conducted in the recovery system of claim 1, comprising:
   vaporizing a refrigerant, wherein the vaporizing the refrigerant comprises:
      introducing the refrigerant through the first stage heat exchanger, the plurality of second stage heat exchangers, and the third stage heat exchanger sequentially; and
      introducing the flue gas feed through the third stage heat exchanger, the plurality of second stage heat exchangers, and the first stage heat exchanger sequentially;
   introducing the vaporized refrigerant to the turbo-expander to generate electricity;
   condensing the vaporized refrigerant in the at least one condenser;
   collecting nitrogen from the flue gas feed in the nitrogen generator; and
   collecting water from the flue gas feed in the gas-liquid separator.

5. The method of claim 4, further comprising combusting a fuel in the internal combustion system to produce electricity and the flue gas feed.

6. The method of claim 5, wherein an increase ratio of an electrical power produced by the method, based on an electrical power produced by the combusting of the fuel in the internal combustion system, is at least 0.18.

7. The method of claim 5, wherein:
   an amount of collected nitrogen is at least 1 ton/hr based on 1 MW of electrical power produced by the combusting of the fuel in the internal combustion system, and
   an amount of collected water is at least 10 USGPM based on 1 MW of electrical power produced by the combusting of the fuel in the internal combustion system.

8. The method of claim 4, further comprising pressurizing the flue gas feed during the introducing the flue gas feed through the plurality of the second stage heat exchanger.

9. The method of claim 4, further comprising introducing the flue gas feed to the gas-liquid separator at a temperature below a condensation temperature of water.

10. The method of claim 9, wherein the temperature of the flue gas feed introduced to the gas-liquid separator is maintained below the condensation temperature of water by introducing the flue gas feed exiting the nitrogen generator to the plurality of second stage heat exchangers.

11. The method of claim 4, wherein the refrigerant is selected from the group consisting of ammonia, propane, freon, propylene, butane, toluene, benzene and combinations thereof.

12. The method of claim 4, wherein, as a result of the vaporizing, at least 99 wt % of the refrigerant is vaporized.

13. The method of claim 4, wherein, as a result of the condensing, at least 99 wt % of the refrigerant is condensed.

14. The method of claim 4, wherein:
   the refrigerant introduced to the turbo-expander has a temperature in a range from 350° F. to 400° F., and
   the refrigerant introduced to the first stage heat exchanger has a temperature of 90° C. or lower.

15. The method of claim 4, wherein the flue gas feed introduced to the plurality of the second stage heat exchangers has a temperature above a condensation temperature of water.

16. The method of claim 4, wherein the flue gas feed exiting the first stage heat exchanger has a temperature 20° F. or more below a condensation temperature of water.

17. The method of claim 4, wherein the flue gas feed exiting the nitrogen generator has a water vapor concentration in a range from 30 to 40 vol %.

18. A recovery system comprising:
   a Rankine cycle system, comprising:
      a first stage heat exchanger;
      a plurality of second stage heat exchangers;
      a third stage heat exchanger;
      a turbo-expander; and
      a two-stage condenser comprising an air cooler and a water cooler connected in series,
      wherein:

the Rankine cycle system is configured to generate electricity with heat provided by a flue gas feed, the plurality of the second stage heat exchangers is fluidly connected to the first stage heat exchanger and the third stage heat exchanger, the turbo-expander is fluidly connected to the third stage heat exchanger and the two-stage condenser, and the first stage heat exchanger is fluidly connected to the at least one condenser, an internal combustion system configured to provide the flue gas feed to the Rankine cycle system, and fluidly connected to the third stage heat exchanger;

a nitrogen generator configured to collect nitrogen from the flue gas feed, and fluidly connected to the first stage heat exchanger and the plurality of the second stage heat exchangers; and a gas-liquid separator configured to collect water from the flue gas feed, and fluidly connected to the first stage heat exchanger.

19. The recovery system of claim 18, wherein the internal combustion system is a combustion gas turbine/heat recovery steam generation (CGT/HRSG) system.

20. A recovery system comprising:
a Rankine cycle system, comprising:
a first stage heat exchanger;
a plurality of second stage heat exchangers configured to receive a refrigerant in parallel and receive a flue gas feed in series;
a third stage heat exchanger;
a turbo-expander; and
at least one condenser,
wherein:
the Rankine cycle system is configured to generate electricity with heat provided by the flue gas feed,
the plurality of the second stage heat exchangers is fluidly connected to the first stage heat exchanger and the third stage heat exchanger,
the turbo-expander is fluidly connected to the third stage heat exchanger and the at least one condenser, and
the first stage heat exchanger is fluidly connected to the at least one condenser, an internal combustion system configured to provide the flue gas feed to the Rankine cycle system, and fluidly connected to the third stage heat exchanger;

a nitrogen generator configured to collect nitrogen from the flue gas feed, and fluidly connected to the first stage heat exchanger and the plurality of the second stage heat exchangers; and a gas-liquid separator configured to collect water from the flue gas feed, and fluidly connected to the first stage heat exchanger.

* * * * *